(12) United States Patent
An et al.

(10) Patent No.: US 11,180,403 B2
(45) Date of Patent: Nov. 23, 2021

(54) GLASS PRODUCT MANUFACTURING APPARATUS

(71) Applicant: Corning Incorporated, Corning, NY (US)

(72) Inventors: Jang-hun An, Asan-si (KR); Byung-chul Jeon, Asan-si (KR); Sun-joon Kim, Suwon-si (KR); Yong-kyu Kwon, Asan-si (KR); Ho-soon Lee, Cheonan-Si (KR); Seong-kuk Lee, Cheonan-si (KR); Hyun-gyu Park, Asan-si (KR)

(73) Assignee: Corning Incorporated, Corning, NY (US)

( * ) Notice: Subject to any disclaimer, the term of this patent is extended or adjusted under 35 U.S.C. 154(b) by 177 days.

(21) Appl. No.: 16/495,672

(22) PCT Filed: Mar. 20, 2018

(86) PCT No.: PCT/US2018/023301
§ 371 (c)(1),
(2) Date: Sep. 19, 2019

(87) PCT Pub. No.: WO2018/175398
PCT Pub. Date: Sep. 27, 2018

(65) Prior Publication Data
US 2020/0017389 A1 Jan. 16, 2020

(30) Foreign Application Priority Data
Mar. 20, 2017 (KR) .................. 10-2017-0034757

(51) Int. Cl.
*C03B 5/435* (2006.01)
*C03B 5/02* (2006.01)
(Continued)

(52) U.S. Cl.
CPC ............. *C03B 5/435* (2013.01); *C03B 5/02* (2013.01); *C03B 5/185* (2013.01); *C03B 5/237* (2013.01); *C03B 5/26* (2013.01)

(58) Field of Classification Search
None
See application file for complete search history.

(56) References Cited

U.S. PATENT DOCUMENTS

| 5,006,141 A | 4/1991 | Chen et al. |
| 5,488,915 A * | 2/1996 | McNeill ............... C03B 3/026 110/345 |

(Continued)

FOREIGN PATENT DOCUMENTS

| CN | 1081761 A | 2/1994 |
| CN | 1172081 A | 2/1998 |

(Continued)

OTHER PUBLICATIONS

Korean Patent Application No. 10-2017-0034757, Office Action dated Apr. 20, 2021, 11 pages (5 pages of English Translation and 6 pages of Original Document), Korean Patent Office.

(Continued)

*Primary Examiner* — Lisa L Herring
(74) *Attorney, Agent, or Firm* — Matthew J. Mason

(57) ABSTRACT

Provided is a glass product manufacturing apparatus. The glass product manufacturing apparatus includes a furnace including a gas heating zone and an electric heating zone, a first heat exchange module configured to recover heat from the furnace, and a pump configured to drive flow of a heat transfer medium fluid passing through the first heat exchange module, wherein at least a part of the first heat exchange module is thermally coupled with at least a part of an external surface of the electric heating zone. The glass (Continued)

product manufacturing apparatus may reduce defect rate while exhibiting high energy efficiency.

15 Claims, 10 Drawing Sheets

(51) Int. Cl.
*C03B 5/185* (2006.01)
*C03B 5/237* (2006.01)
*C03B 5/26* (2006.01)

(56) References Cited

U.S. PATENT DOCUMENTS

| | | | |
|---|---|---|---|
| 5,536,291 A | 7/1996 | Sorg et al. | |
| 5,659,564 A | 8/1997 | Elliott | |
| 6,799,539 B2 | 10/2004 | Suenaga et al. | |
| 2001/0052246 A1 | 12/2001 | Kamata | |
| 2009/0084139 A1 | 4/2009 | Kobayashi | |
| 2010/0081103 A1 | 4/2010 | Kobayashi | |
| 2011/0289967 A1 | 12/2011 | Burdette | |
| 2012/0216571 A1 | 8/2012 | Sakamoto et al. | |
| 2012/0297838 A1 | 11/2012 | Borsa et al. | |
| 2014/0208800 A1 | 7/2014 | McCann et al. | |
| 2018/0195802 A1* | 7/2018 | Kobayashi | F27D 99/0033 |
| 2019/0210908 A1 | 7/2019 | Dannoux et al. | |

FOREIGN PATENT DOCUMENTS

| | | |
|---|---|---|
| CN | 1300720 A | 6/2001 |
| CN | 1306945 A | 8/2001 |
| CN | 101808950 A | 8/2010 |
| CN | 102459101 A | 5/2012 |
| CN | 102471117 A | 5/2012 |
| CN | 102906036 A | 1/2013 |
| CN | 202988958 U | 6/2013 |
| CN | 103702951 A | 4/2014 |
| CN | 204298230 U | 4/2015 |
| CN | 104813103 A | 7/2015 |
| JP | 62-162891 A | 7/1987 |
| KR | 10635649 B1 | 10/2006 |
| KR | 2010097441 A | 9/2010 |
| KR | 10-2011-0074881 A | 7/2011 |
| KR | 102014057280 A | 5/2014 |
| KR | 2014066699 A | 6/2014 |
| WO | WO-0000440 A1 * 1/2000 | ............... C03B 5/04 |
| WO | WO-2013013875 A1 * 1/2013 | ............... F23L 15/04 |
| WO | 2016/102621 A1 | 6/2016 |
| WO | 2016/102629 A1 | 6/2016 |
| WO | 2017/021624 A1 | 2/2017 |
| WO | 2017/218652 A1 | 12/2017 |

OTHER PUBLICATIONS

Extended Supplementary European Search Report and Search Opinion; 18772203.8; dated Nov. 23, 2020; 7 pages; European Patent Office.

International Search Report and Written Opinion of the International Searching Authority; PCT/US2018/023301; dated Jul. 4, 2018; 11 Pages; Korean Intellectual Property Office.

Chinese Patent Application No. 20180019918.7, Office Action dated Aug. 30, 2021, 10 pages (5 pages of English Translation and 5 pages of Original Document), Chinese Patent Office.

* cited by examiner

GLASS PRODUCT MANUFACTURING APPARATUS

This application claims the benefit of priority under 35 U.S.C. § 371 of International Application No. PCT/US2018/023301, filed on Mar. 20, 2018, which claims the benefit of priority to Korean Patent Application Serial No. 10-2017-0034757, filed on Mar. 20, 2017, the content of each are relied upon and incorporated herein by reference in their entirety.

TECHNICAL FIELD

The present disclosure relates to a glass product manufacturing apparatus, and more particularly, to a glass product manufacturing apparatus, whereby defect rate is reduced and energy efficiency is increased.

BACKGROUND

In the manufacture of glass products, it may be advantageous to increase the energy efficiency and reduce the defect rate of the manufacturing process.

SUMMARY

According to embodiments of the disclosure, there is provided a glass product manufacturing apparatus including: a furnace including a gas heating zone and an electric heating zone; a first heat exchange module configured to recover heat from the furnace; and a pump configured to drive flow of a heat transfer medium fluid passing through the first heat exchange module, wherein at least a part of the first heat exchange module is thermally coupled with at least a part of an external surface of the electric heating zone.

The glass product manufacturing apparatus may further include: a glass product processor configured to supply a processing fluid for processing the glass product; and a second heat exchange module configured to heat the processing fluid, wherein the second heat exchange module may be configured to transfer heat from the heat transfer medium fluid to the processing fluid.

The gas heating zone may be at a higher level than a highest level of glass melt in the furnace, and the electric heating zone may be at a lower level than the highest level of the glass melt in the furnace.

At least a part of the first heat exchange module may be in surface contact with an external surface of the electric heating zone.

The first heat exchange module may be adhered to the external surface of the electric heating zone via a fixing member.

A surface-contact area between the first heat exchange module and the external surface of the electric heating zone may range from 15% to 60% of an entire area of an external wall of the furnace.

The first heat exchange module may be spaced apart from the external surface of the furnace.

A surface of the first heat exchange module facing the external surface of the furnace, may be substantially parallel with the external surface of the furnace.

According to embodiments of the disclosure, there is provided a glass product manufacturing apparatus including: a furnace including a gas heating zone and an electric heating zone; a glass product processor configured to supply a processing fluid for processing the glass products; and a heat exchange device, wherein the heat exchange device includes: a first heat exchange module configured to recover heat from the furnace; a second heat exchange module configured to heat the processing fluid; a heat transfer medium fluid circulating between the first heat exchange module and the second heat exchange module; and a pump configured to drive a flow of the heat transfer medium fluid.

The first heat exchange module may include three sections spaced apart from one another in a lateral direction.

The heat transfer medium fluid may be water.

The first heat exchange module may be configured to raise a temperature of the heat transfer medium fluid by about 7° C. to about 15° C.

The second heat exchange module may be configured to raise a temperature of the processing fluid by about 3° C. to about 8° C.

The glass product manufacturing apparatus may further include a first tank configured to store the heat transfer medium fluid supplied to the first heat exchange module, wherein the heat transfer medium fluid discharged from the first heat exchange module may be recycled in the first tank.

The glass product manufacturing apparatus may further include a second tank configured to store the heat transfer medium fluid discharged from the second heat exchange module.

The furnace may include a first side wall to which a supply device for supplying a raw material is coupled and a second side wall in which a glass melt outlet is mounted, and the first heat exchange module may directly contact the first side wall.

DETAILED DESCRIPTION

Figure 1:
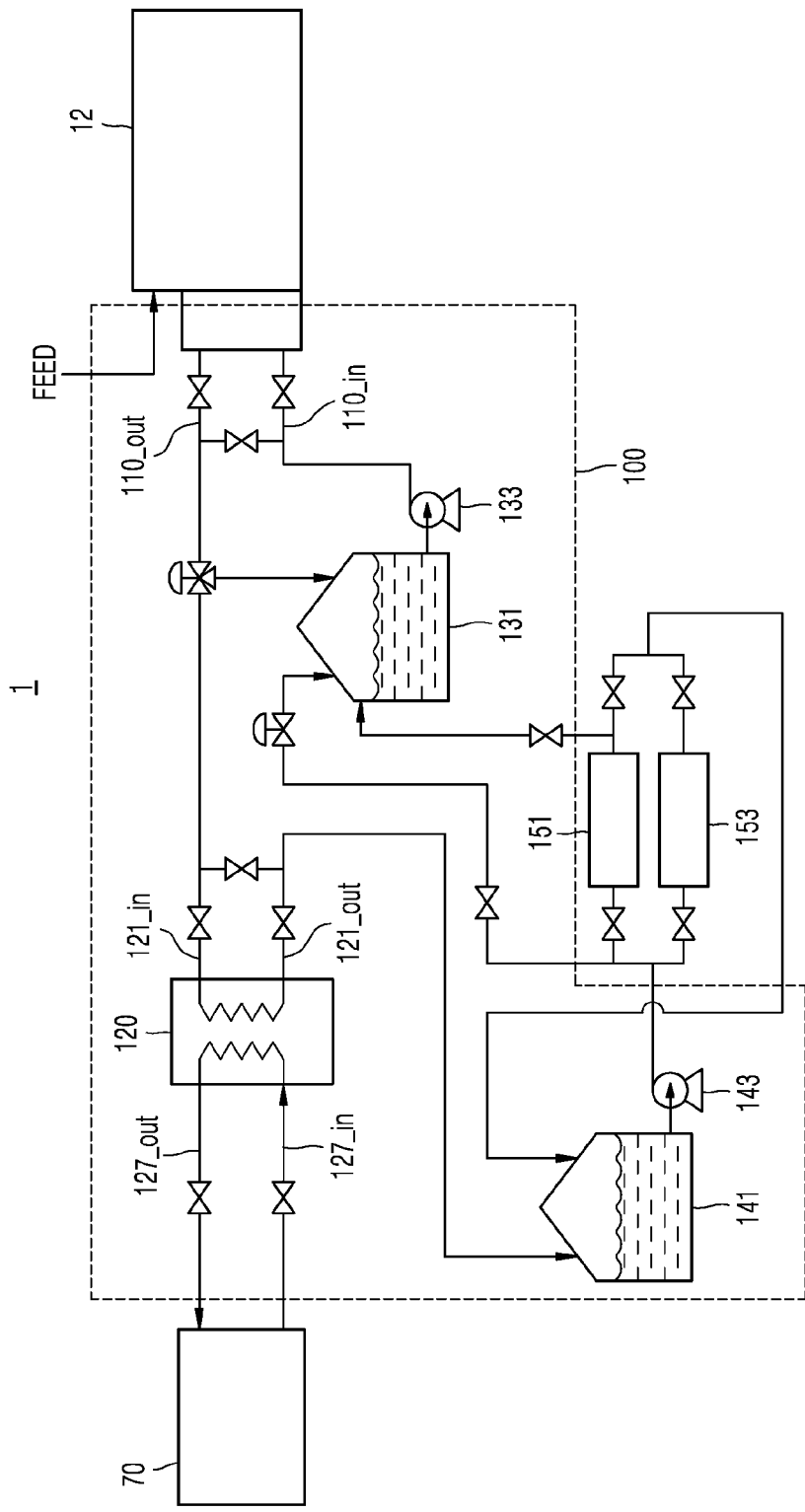
FIG. 1 is a block diagram of a glass product manufacturing apparatus according to some embodiments.

The disclosure will now be described more fully with reference to the accompanying drawings, in which exemplary embodiments are shown. The subject matter of the disclosure may, however, be embodied in many different forms and should not be construed as being limited to the exemplary embodiments set forth herein; rather, these embodiments are provided so that this disclosure will convey the subject matter to those skilled in the art. In the drawings, the thicknesses of layers and regions may be exaggerated for clarity. Wherever possible, like reference numerals in the drawings will denote like elements. Therefore, the disclosure is not limited by relative sizes or intervals as shown in the accompanied drawings.

While such terms as "first," "second," etc., may be used to describe various components, such components are not limited to the above terms. The above terms are used only to distinguish one component from another. For example, a first component may indicate a second component or a second component may indicate a first component without conflicting.

The terms used herein in various exemplary embodiments are used to describe exemplary embodiments only, and should not be construed to limit the various additional embodiments. Singular expressions, unless defined otherwise in contexts, include plural expressions. The terms "comprises" or "may comprise" used herein in various exemplary embodiments may indicate the presence of a corresponding function, operation, or component and do not limit one or more additional functions, operations, or components. It will be further understood that the terms "comprises" and/or "comprising," when used in this specification, may be used to specify the presence of stated features, integers, steps, operations, elements, and/or components, but do not preclude the presence or addition of one or more other features, integers, steps, operations, elements, components, and/or groups thereof.

When a certain embodiment may be implemented differently, a specific process order may be performed differently from the described order. For example, two consecutively described processes may be performed substantially at the same time or performed in an order opposite to the described order.

Variations from the shapes of the illustrations as a result, for example, of manufacturing techniques and/or tolerances, are to be expected. Thus, embodiments of the disclosure should not be construed as limited to the particular shapes of regions illustrated herein, but are to include deviations in shapes that result, for example, from manufacturing. As used herein, the term "and/or" includes any and all combinations of one or more of the associated listed items.

FIG. 1 is a block diagram of a glass product manufacturing apparatus 1 according to an embodiment.

Referring to FIG. 1, the glass product manufacturing apparatus 1 includes a furnace 12 and a first heat exchange module 110.

In some embodiments, the first heat exchange module 110 may be provided on an external surface of the furnace 12. Here, the first heat exchange module 110 being provided "on the external surface" of the furnace 12 may denote that the first heat exchange module 110 physically contacts the external surface of the furnace 12 or that the first heat exchange module 110 is spaced apart a predetermined interval from the external surface of the furnace 12.

In some embodiments, the first heat exchange module 110 may be provided directly on the external surface of the furnace 12. Here, the first heat exchange module 110 being provided "directly on the external surface" of the furnace 12 may denote that the first heat exchange module 110 is in physical contact with the external surface of the furnace 12.

In some other embodiments, the first heat exchange module 110 may be spaced apart a predetermined distance from the external surface of the furnace 12. The predetermined distance may, for example, be about 5 mm to about 30 mm.

The first heat exchange module 110 may be provided to transfer heat from the furnace 12 through conduction, convection, and/or radiation and this will be described in detail later.

The first heat exchange module 110 may use a heat transfer medium fluid for heat exchange. The heat transfer medium fluid may be, for example, water, oil, inert gas, etc., but is not limited thereto. In some embodiments, the heat transfer medium fluid may be water. A temperature of the heat transfer medium fluid rises during passing through the first heat exchange module 110 because the heat transfer medium fluid absorbs heat from the furnace 12.

In detail, a difference between temperatures at a first inlet 110_in, through which the heat transfer medium fluid is introduced into the first heat exchange module 110, and a first outlet 110_out, through which the heat transfer medium fluid is discharged from the first heat exchange module 110, may, for example, be about 7° C. to about 15° C. For example, the temperature of the heat transfer medium fluid that is introduced through the first inlet 110_in may be about 65° C. to about 75° C. In addition, the temperature of the heat transfer medium fluid discharged through the first outlet 110_out may, for example, be about 75° C. to about 85° C.

The heat transfer medium fluid may be stored in a first tank 131, and may be supplied to the first heat exchange module 110 by a pump 133. In FIG. 1, the first tank 131 is shown to store liquid, but one of ordinary skill in the art would appreciate that gas may be stored in the first tank 131.

The glass product manufacturing apparatus 1 may further include a glass product processor 70 and a second heat exchange module 120.

The glass product processor 70 may perform one or more unit processes for manufacturing glass products by using glass melt that is generated in the furnace 12, for example, drawing, cutting, cleaning, rinsing, etc. In such a unit process, a processing fluid having an elevated temperature, e.g., water, oil, inert gas, etc. may be advantageous. For instance, a processing fluid having an elevated temperature may facilitate the removal of dirt, impurities, etc. from the surface of glass in the cleaning process. Alternatively, the processing fluid having an elevated temperature may promote the removal of cleaning liquid from the surface of glass in the rinsing process. As described above, increasing temperature of the processing fluid may be achieved by the second heat exchange module 120.

The second heat exchange module 120 may raise the temperature of the processing fluid used in the glass product processor 70. The heat transfer medium fluid, the temperature of which increases in the first heat exchange module 110, may be supplied to the second heat exchange module 120. In addition, the heat transfer medium fluid transfers heat to the processing fluid while passing through the second heat exchange module 120 to raise the temperature of the processing fluid. In some embodiments, the heat transfer medium fluid discharged from the first heat exchange module 110 may be at least partially recycled to the first tank 131.

In detail, a difference between temperatures at a second inlet 121_in, through which the heat transfer medium fluid is introduced into the second heat exchange module 120, and a second outlet 121_out, through which the heat transfer medium fluid is discharged from the second heat exchange module 120, may, for example, be about 15° C. to about 25° C. For example, the temperature of the heat transfer medium fluid introduced through the second inlet 121_in may be about 74° C. to about 84° C. In addition, the temperature of the heat transfer medium fluid discharged through the second outlet 121_out may, for example, be about 55° C. to about 65° C.

In addition, a difference between temperatures at a third inlet 127_in, through which the processing fluid is introduced to the second heat exchange module 120, and a third outlet 127_out, through which the processing fluid is discharged from the second heat exchange module 120, may, for example, be about 3° C. to about 8° C. For example, the processing fluid introduced through the third inlet 127_in may have a temperature of about 47° C. to about 53° C. In addition, the processing fluid discharged through the third outlet 127_out may have a temperature of about 52° C. to about 58° C.

The heat transfer medium fluid that has been cooled down by transferring heat to the processing fluid may be conveyed to and stored in a second tank 141. FIG. 1 illustrates that the second tank 141 stores liquid, but one of ordinary skill in the art would appreciate that the second tank 141 may store gas.

The heat transfer medium fluid in the second tank 141 may be conveyed to the first tank 131 directly or after passing through a first cooling unit 151. In addition, the heat transfer medium fluid may be recycled to the second tank 141, after passing through the first cooling unit 151.

The first cooling unit 151 may involve at least one of manufacturing processes of the glass product or other utility processes, and a temperature at an outlet of the first cooling unit 151 may, for example, be about 60° C. to about 75° C.

In addition, the heat transfer medium fluid in the second tank 141 may be recycled to the second tank 141 after passing through a second cooling unit 153 such as a drawing machine.

As described above, the furnace 12 and the glass product processor 70 may be thermally connected to each other via the first heat exchange module 110, the second heat exchange module 120, the heat transfer medium fluid, and the pumps 133 and 143. Here, the first heat exchange module 110, the second heat exchange module 120, the heat transfer medium fluid, and the pumps 133 and 143 may be defined as a heat exchange device 100.

Figure 2:
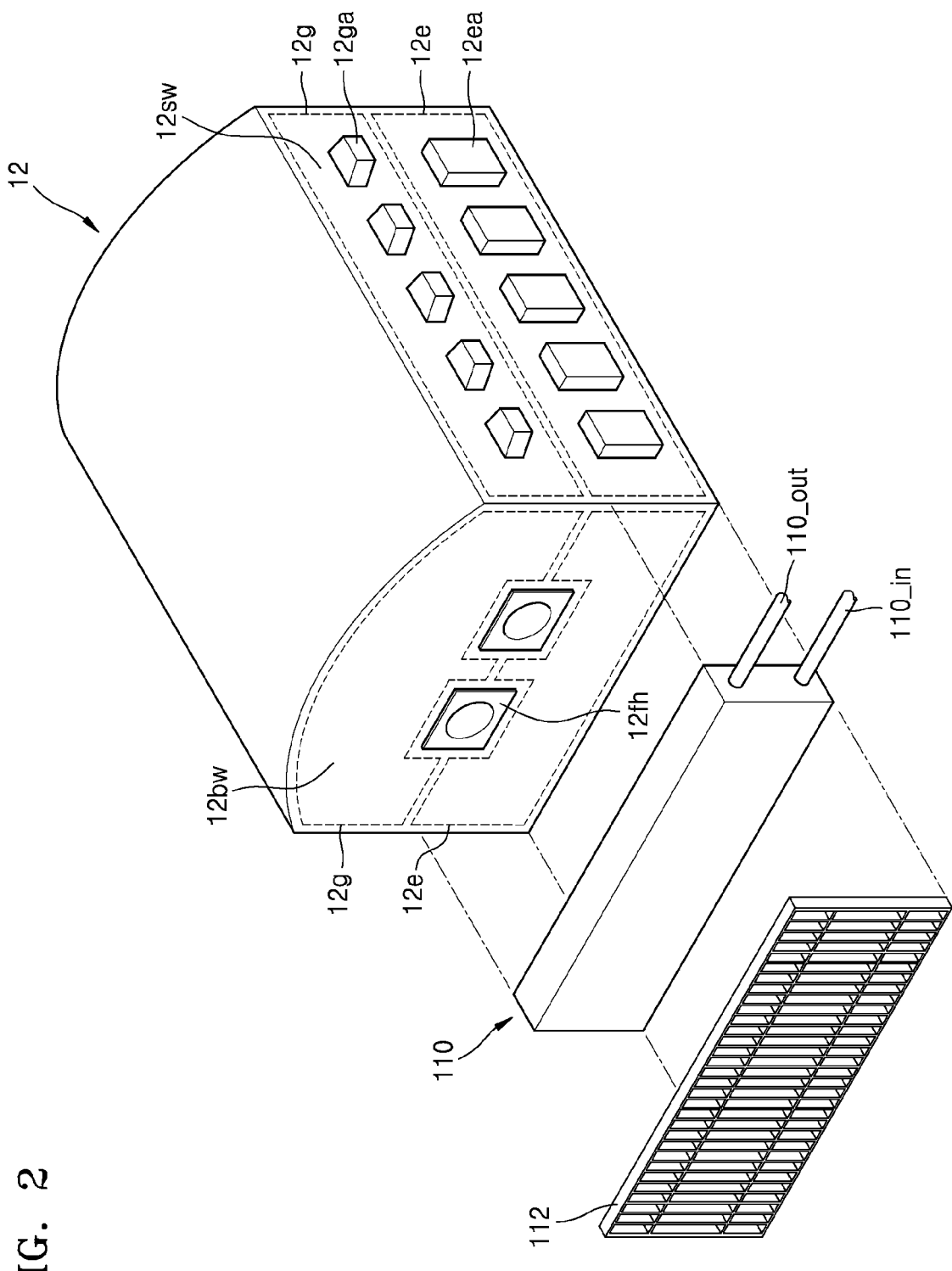
FIG. 2 is an exploded perspective view of a first heat exchange module and a furnace according to an embodiment.

FIG. 2 is an exploded perspective view of the first heat exchange module 110 and the furnace 12 according to an embodiment.

Referring to FIG. 2, the furnace 12 may include a gas heating zone 12g and an electric heating zone 12e. The gas heating zone 12g is generally located above the electric heating zone 12e.

The gas heating zone 12g may supply energy into the furnace 12 by using burners 12ga that use gas as a fuel. The electric heating zone 12e may supply energy into the furnace 12 by using electrodes 12ea.

The electrodes 12ea may be immersed in the glass melt in the furnace 12. In addition, a liquid level of the glass melt in the furnace 12 may be located between levels of the burners 12ga and the electrodes 12ea. That is, the burners 12ga may be located higher than the highest level of the glass melt, and the electrodes 12ea may be located lower than the highest level of the glass melt. In some embodiments, the gas heating zone 12g may be located higher than the highest level of the glass melt, and the electric heating zone 12e may be located lower than the highest level of the glass melt.

The electrodes 12ea and the burners 12ga each may be provided on opposite side walls 12sw facing each other of the furnace 12.

In addition, the first heat exchange module 110 may be provided on a back wall 12bw of the furnace 12. A feed opening 12th for supplying a raw material of glass melt may be formed in the back wall 12bw of the furnace 12. The glass melt generated in the furnace 12 may be supplied to processes for manufacturing a glass product through a wall opposite the back wall 12bw.

The first heat exchange module 110 may be disposed to overlap at least partially with the electric heating zone 12e. In some embodiments, at least a part of the first heat exchange module 110 may be disposed to overlap with at least a part of the electric heating zone 12e. In some embodiments, the first heat exchange module 110 may be disposed to completely overlap with the electric heating zone 12e. In some embodiments, the first heat exchange module 110 may partially overlap with the electric heating zone 12e and partially overlap with the gas heating zone 12g. Here, 'overlapping' with the electric heating zone 12e may denote that, when an outer circumference of the first heat exchange module 110 is projected onto an external surface of the furnace 12, the circumference of the first heat exchange module 110 overlaps with the electric heating zone 12e.

The first heat exchange module 110 may be fixed on the furnace 12 by a fixing member 112. The fixing member 112 may be any coupling member that may fix the first heat exchange module 110 to the furnace 12, but is not limited thereto. The fixing member 112 may be, for example, a grating, a bar, a wire, etc.

The first heat exchange module 110 may be in contact with the external surface of the furnace 12 or may be spaced apart a predetermined distance from the external surface of the furnace 12.

Figure 3A:
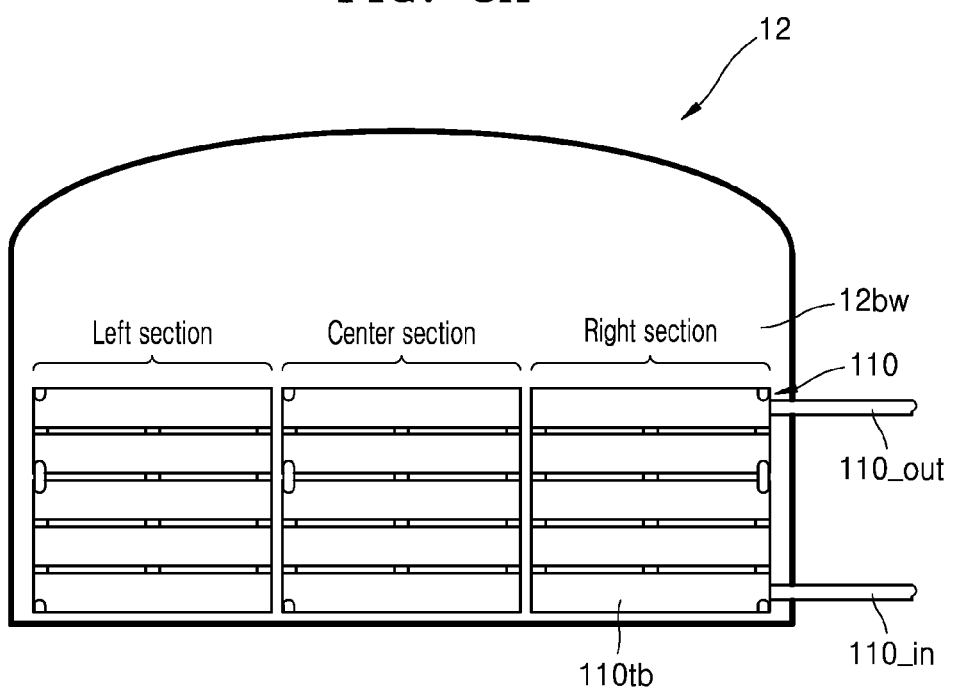
FIG. 3A is a front view of the first heat exchange module installed on a back wall of the furnace according to an embodiment.
Figure 3B:
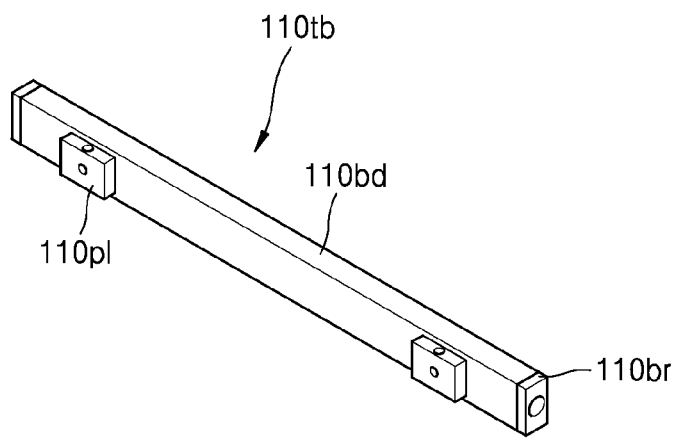
FIG. 3B is a perspective view of tubes in the first heat exchange module according to an embodiment.

FIG. 3A is a front view of the first heat exchange module 110 provided on the back wall 12bw of the furnace 12 according to an embodiment. FIG. 3B is a perspective view of each tube forming the first heat exchange module 110 according to an embodiment.

Referring to FIGS. 3A and 3B, the first heat exchange module 110 may include a plurality of tubes 110tb connected to one another. The plurality of tubes 110tb may be connected to one another in parallel and/or in series. In some embodiments, the plurality of tubes 110tb may each include three sections spaced apart from one another in a lateral direction.

Each tube 110tb may include a tube body 110bd having openings at opposite sides thereof, a tube bar 110br for defining an internal space of the tube body 110bd together with the tube body 110bd, and a tube plate 110p1 for fixing the tube body 110bd to a frame. In FIG. 3B, the tube body 110bd and the tube bar 110br may be separately formed, but one of ordinary skill in the art would appreciate that the tube body 110bd and the tube bar 110br may be integrally or monolithically formed with each other. In addition, in FIG. 3B, the tube body 110bd has a rectangle-shaped cross-section, but one of ordinary skill in the art would appreciate that the tube body 110bd may have a cross-section of other shapes than the rectangle.

In some embodiments, from among external surfaces of the tube 110tb, a surface facing the furnace 12 may be planar. In particular, the first heat exchange module 110 may be formed so that the planar surface may be substantially in parallel with the external surface of the furnace 12.

As described above, the first heat exchange module 110 may be installed in contact with the external surface of the furnace 12 or to be separated a predetermined distance from the external surface of the furnace 12. When the first heat exchange module 110 is installed in contact with the external surface of the furnace 12, one of the surfaces of the tube body 110*bd* may be in surface contact with the external surface so as to receive the heat from the furnace 12 via conduction.

Here, a surface contact area between the first heat exchange module 110 and the external surface of the furnace 12 may be about 15% to about 60% of an entire area of an external wall where the first heat exchange module 110 is installed (here, the back wall 12*bw* of the furnace 12), from among the external walls of the furnace 12. If a ratio of the surface contact area is too low, the thermal transfer through the conduction may be insufficient. If the ratio of the surface contact area is too high, interference with other components included in the furnace 12 may occur.

In addition, if the surface of the tube body 110*bd* facing the furnace 12 is the planar surface, heat radiation from the furnace 12 may be effectively reflected back to the furnace 12. In particular, if the tube body 110*bd* includes a material that may effectively reflect the heat radiation, for example, metal, the heat radiation from the furnace 12 may be effectively reflected back to the furnace 12.

Figure 4A:
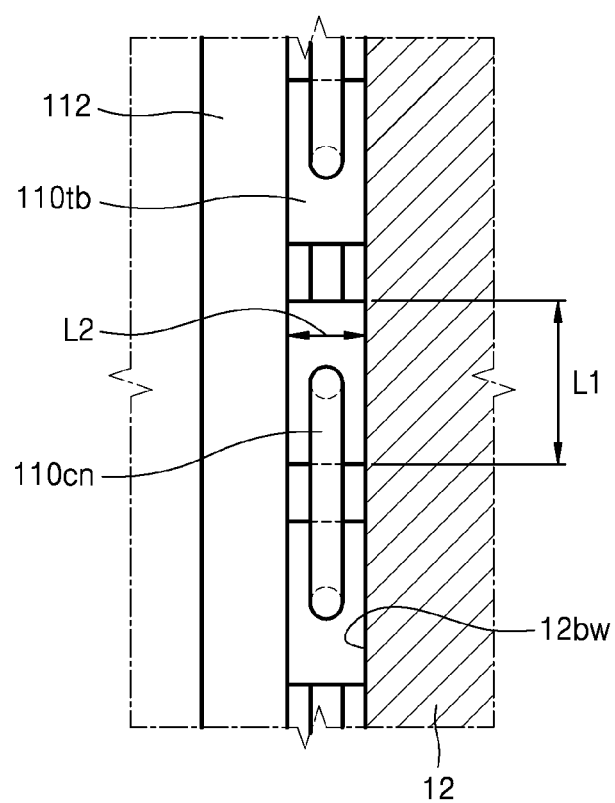
FIGS. 4A to 4C are side-sectional views conceptually showing contact conditions between the tubes and the furnace according to embodiments.
Figure 4B:
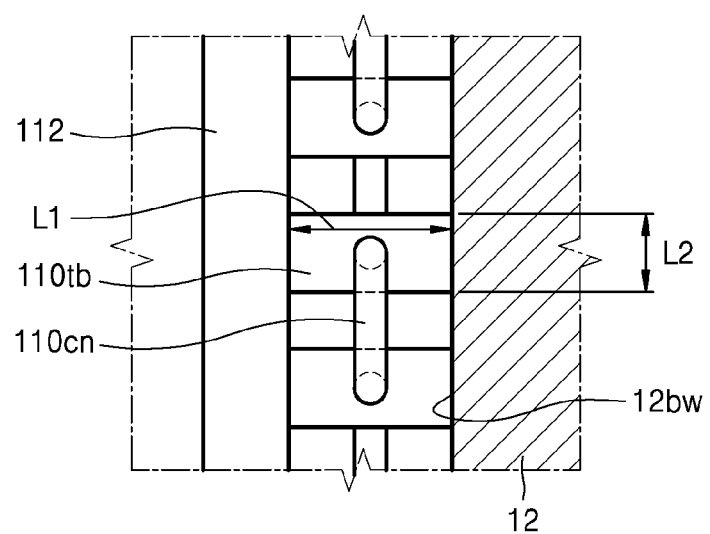
Figure 4C:
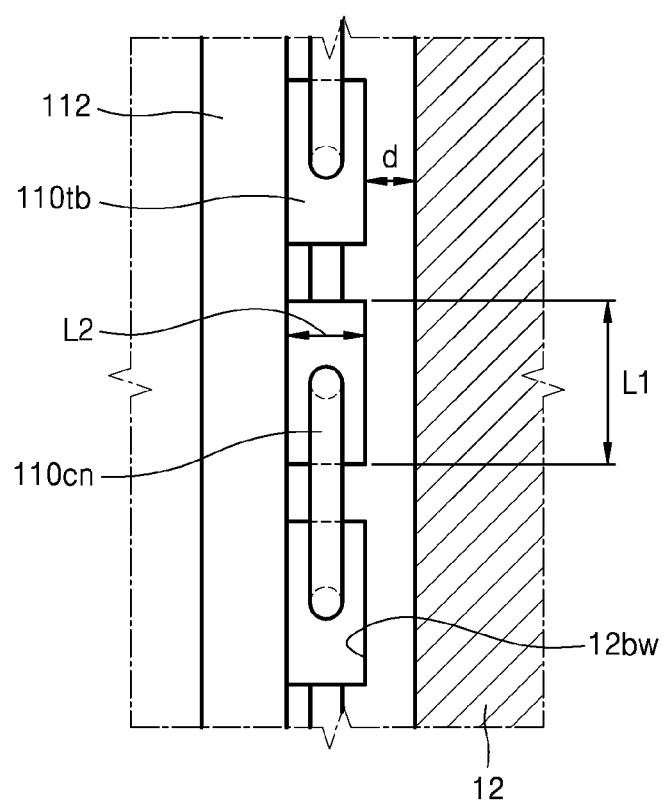

FIGS. 4A to 4C are side-sectional views conceptually illustrating embodiments of contact between the tube 110*tb* and the furnace 12.

Referring to FIG. 4A, the tubes 110*tb* are connected to one another via conduits 110*cn*, and a surface of each tube 110*tb* is adhered onto the back wall 12*bw* of the furnace 12. That is, the tube 110*tb* and the back wall 12*bw* are in surface contact with each other. The adhesion via the surface contact may be strengthened by the fixing member 112.

In particular, a rectangular cross-section of the tube 110*tb* has the sides having lengths L1 and L2 (L1>L2), and the first heat exchange module 110 may be configured so that a longer side may face the back wall 12*bw*. In this case, the heat transfer via the conduction may increase. In other words, a ratio of the heat transfer through the conduction with respect to a total amount of heat transfer may increase.

Referring to FIG. 4B, the tubes 110*tb* may be connected to one another via the conduits 110*cn*, and a surface of each tube 110*tb* is adhered onto the back wall 12*bw* of the furnace 12. That is, the tube 110*tb* and the back wall 12*tw* are in surface contact with each other.

Unlike the example illustrated in FIG. 4A, the first heat exchange module 110 illustrated in FIG. 4B may be configured so that a shorter side of the tube 110*tb* may face the back wall 12*bw*. In this case, a ratio of the heat transfer through the conduction with respect to a total amount of heat transfer may be lower than that of the example illustrated with reference to FIG. 4A. In other words, a ratio of the heat transfer through the radiation or convection with respect to the total amount of heat transfer may be greater than that of the example illustrated with reference to FIG. 4A.

Referring to FIG. 4C, the tubes 110*tb* are connected to one another via the conduits 110*cn*, and the tube 110*tb* is separated by a distance d from the back wall 12*bw*. This case may be intended to prevent the heat transfer through the conduction between the tube 110*tb* and the back wall 12*bw*, because the heat transfer through the conduction may cause disadvantage in view of energy efficiency for some cases according to various processing conditions such as a surface temperature of the back wall 12*bw*, a heat transfer capacity of the first heat exchange module 110, an external temperature, etc.

Unlike the examples illustrated with reference to FIGS. 4A and 4B, since each tube 110*tb* does not directly contact the back wall 12*bw*, the heat transfer through the conduction may not occur. Therefore, the heat may be transferred between the tube 110*tb* and the back wall 12*bw* through the convection and/or the radiation, but not through conduction. The heat transfer through the conduction may disadvantageously increase loss of energy through side walls of the furnace 12 to some degree. Therefore, when the heat transfer through the conduction is blocked, energy efficiency of the furnace 12 may be improved.

The distance d may, for example, be about 5 mm to about 30 mm. If the distance d is too small, the heat transfer through the conduction may occur due to unintentional contact between the tube 110*tb* and the back wall 12*bw*. If the distance d is too large, the heat transferring efficiency through the radiation may rapidly degrade.

If necessary, a spacer may be disposed between the tube 110*tb* and the back wall 12*bw* in order to prevent the tube 110*tb* from directly contacting the back wall 12*bw*. Here, the spacer may include a thermally insulating material.

In addition, in a case where the tubes 110*tb* do not necessarily contact the back wall 12*bw* as illustrated with reference to FIG. 4C, the tubes 110*tb* may have various types of cross-sections. For example, the tubes 110*tb* may have a circular cross-section, an oval cross-section, a semicircular cross-section, a polygonal cross-section, etc.

Figure 5:
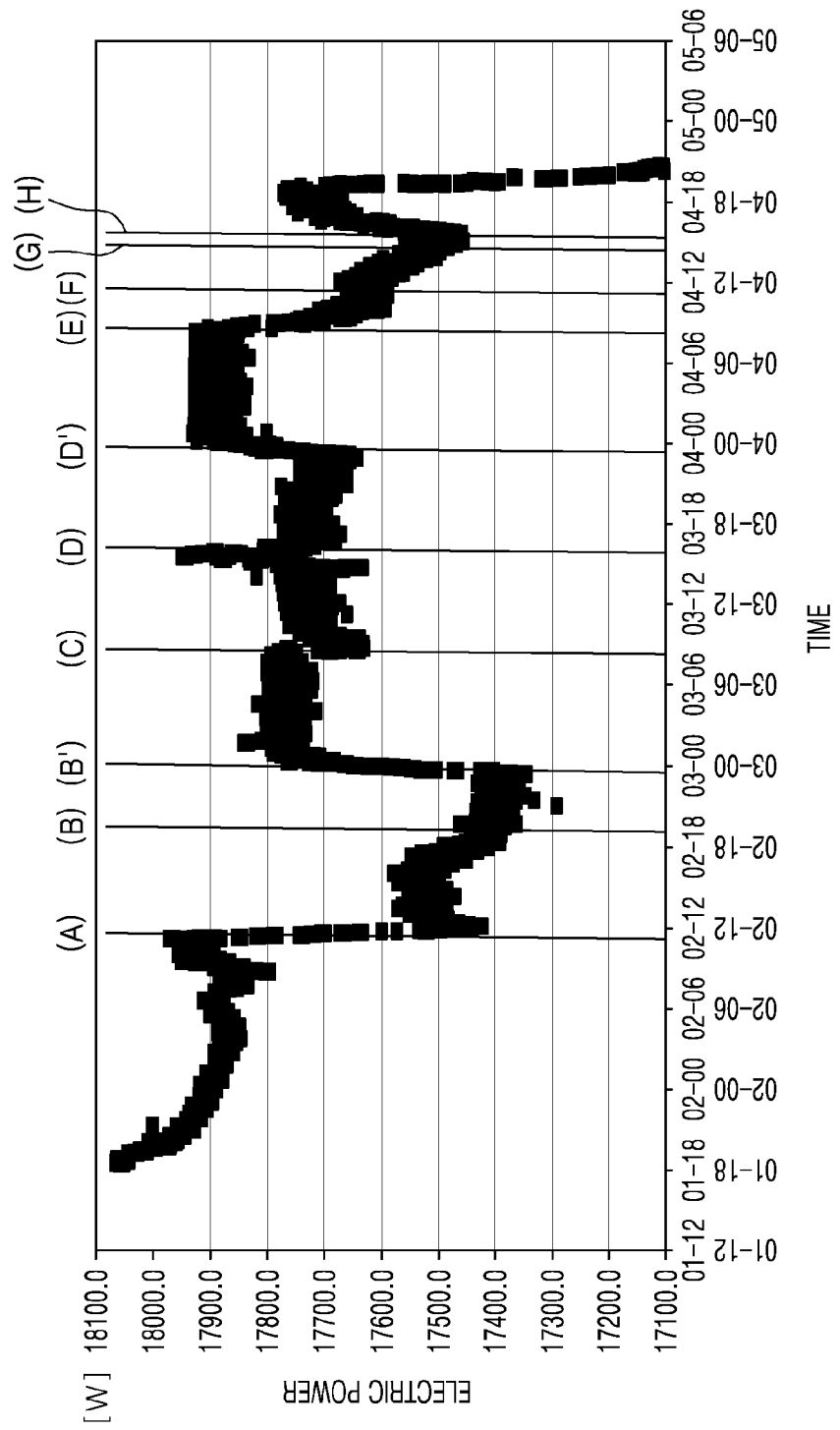
FIG. 5 is a graph of a power consumption in an electric heating zone when the first heat exchange module according to the embodiment is applied to a back wall of the furnace.

FIG. 5 is a graph of power consumption in the electric heating zone 12*e* when the first heat exchange module 110 according to the embodiment is applied to the back wall 12*bw* of the furnace 12.

In FIG. 5, an axis of abscissa denotes operation time, and a longitudinal axis denotes power consumption of the electric heating zone 12*e* for maintaining a set temperature.

Time Point A

A first heat exchange module including three sections was applied onto the back wall of the furnace. One section includes eleven tubes, and in each section, a longer side of the rectangular cross-section of the each tube directly contacted the back wall, as illustrated with reference to FIG. 4A. The longer side of the rectangle has a length of 40 mm.

On installing the first heat exchange module, the power consumption of the electric heating zone rapidly decreased. It may be because a relatively large amount of heat was returned to the furnace by the heat radiation reflection of the first heat exchange module even though there was some heat loss promoted by the conduction.

Time Point B

A heat insulator was reinforced on some external space of the furnace, and then, power consumption of the electric heating zone was slightly decreased.

Time Point B'

A set point of the temperature in the furnace was raised. Accordingly, the power consumption of the electric heating zone increased. And then the melting furnace was stabilized for a certain period.

Time Point C

A first heat exchange module was configured to be identical to that of time point A, except that a shorter side of the rectangular cross-section in each tube directly contacted the back wall as illustrated with reference to FIG. 4B.

Although the power consumption did not decrease dramatically as at the time point A, it was identified that reduction in the power consumption was shown. Since the contact area is less than that at the time point A, the radiation heat reflection effect of the first heat exchange module was reduced.

Time Point D

According to the change in the set point of the temperature in the furnace, the power consumption of the electric heating zone continuously increased. After that, the first heat exchange module was replaced at the time point D with a first heat exchanged module which is identical to the first heat exchange module used at the time point A except that one section of the heat exchange module included eight tubes instead of eleven tubes.

As a result, a reduction amount of the power consumption at the time point D was smaller than that at the time point A, but was greater than that at the time point C.

Time Point D'

The set point of the temperature in the furnace was raised. Accordingly, the power consumption of the electric heating zone was increased. And then the melting furnace was stabilized for a certain period.

Time Point E

The first heat exchange module was not replaced, but the first heat exchange module was separated by one inch (=2.54 cm) from the back wall.

As a result, the power consumption of the electric heating zone was identified to be continuously decreased. The decrease in the power consumption is believed to be due to the heat transfer to the first heat exchange module through the conduction was prevented.

Time Point F

Conditions were the same as those of the time point E, except that the distance between the first heat exchange module and the back wall was changed to ½ inch (=1.27 cm).

The power consumption of the electric heating zone was further decreased, because the heat radiation reflection by the first heat exchange module was increased due to the reduced distance between the first heat exchange module and the back wall.

Time Point G

Conditions were equal to those at the time point F, except that the distance between the first heat exchange module and the back wall was reduced to ¼ inch (=0.635 cm).

The power consumption of the electric heating zone was further reduced, because the heat radiation reflection by the first heat exchange module was further increased due to the reduced distance between the first heat exchange module and the back wall.

Time Point H

Conditions were the same at the time point G, but the first heat exchange module was in contact with the back wall.

Consequently, the power consumption of the electric heating zone was increased, because the heat was discharged due to the conduction due to the contact between the first heat exchange module and the furnace.

As described above, glass products may be manufactured with lower costs by the glass product manufacturing apparatus including the first heat exchange module according to the embodiments. In particular, the glass product manufacturing apparatus according to the embodiments may contribute to reduction in the electric energy.

Figure 6:
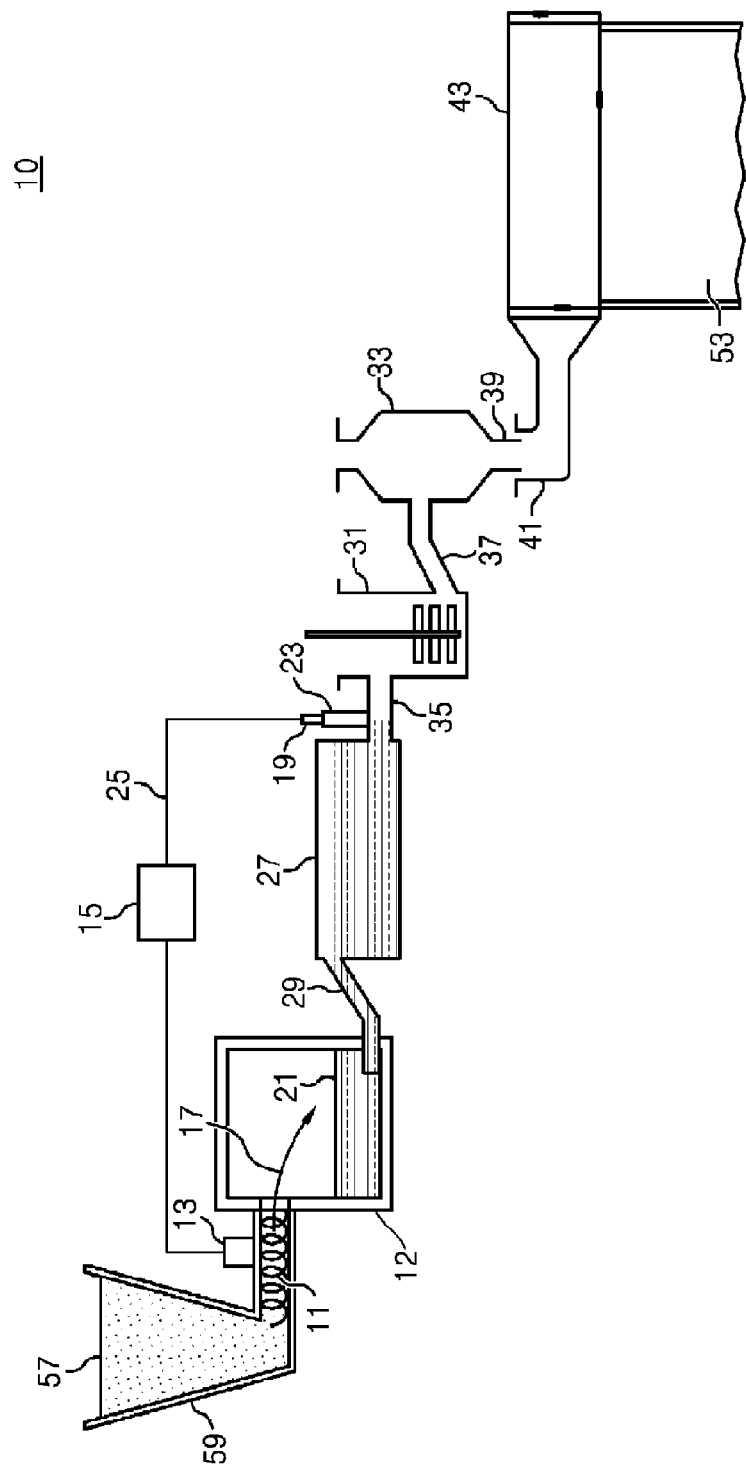
FIG. 6 is a process diagram illustrating processing stages in detail between the furnace and a glass product processor in the glass product manufacturing apparatus according to an embodiment.

FIG. 6 is a processing diagram illustrating processing stages between the furnace 12 and the glass product processor 70 in the glass product manufacturing apparatus 1 (see FIG. 1) according to the embodiment.

Referring to FIG. 6, the glass product manufacturing apparatus 1 may include a batch conveying device 11 capable of feeding a batch material 57 to the furnace 12. The batch material 57 may be introduced into the melting vessel 12 by a batch conveying device 11 that is driven by a motor 13. A controller 15 may control the motor 13 so that the batch material 57 of a desired amount may be introduced into the melting vessel 12, as denoted by an arrow 17. A glass level probe 19 measures a level of a glass melt 21 in a stand pipe 23, and may communicate with the controller 15 to send measured level information via a communication line 25.

The glass article manufacturing apparatus 10 may include a fining vessel 27, e.g., a fining tube, which is located downstream of the melting vessel 12 relative to the flow of molten glass and is in fluid communication with the melting vessel 12 via a first connection tube 29. In addition, a mixing vessel 31, e.g., a stir chamber, may be located downstream of the fining vessel 27, and a delivery vessel 33 may be located downstream of the mixing vessel 31. As shown in the drawing, a second connection tube 35 may connect the fining vessel 27 to the mixing vessel 31, and a third connection tube 37 may connect the mixing vessel 31 to the delivery vessel 33. An exit conduit 39 may be located to transfer the glass melt 21 from the delivery vessel 33 to an inlet tube 41 of a molding apparatus 43. As shown, the melting vessel 12, the fining vessel 27, the mixing vessel 31, the delivery vessel 33, and the molding apparatus 43 are examples of glass melt stations that may be located in series along the glass article manufacturing apparatus 10.

The melting vessel 12 is typically made from a refractory material, such as refractory (e.g. ceramic) brick. The glass article manufacturing apparatus 10 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 29, the fining vessel 27 (e.g., finer tube), the second connecting tube 35, the standpipe 23, the mixing vessel 31 (e.g., a stir chamber), the third connecting tube 37, the delivery vessel 33 (e.g., a bowl), the exit conduit 39 and the inlet 41. The forming vessel 43 is also made from a refractory material and is designed to form the glass ribbon.

At least a part of the furnace 12, for example, at least a part of the internal wall in the furnace 12, may include a refractory article such as fused zirconia (FZ). Application of the first heat exchange module 110 may also reduce cracks occurring in the refractory article, and thus, it is believed to reduce particles of the refractory shed into the glass melt and remaining (e.g., stoning), as defects.

The glass product processor 70 of FIG. 1 may be a forming device 43, or may be one of stages for additionally processing the glass product downstream of the forming device 43, e.g., edge cutting, cleaning, rinsing, etc. Therefore, the furnace 12 and the glass product processor 70 are separately provided in FIG. 1, but they may be two parts in one continuous process flow.

Figure 7:
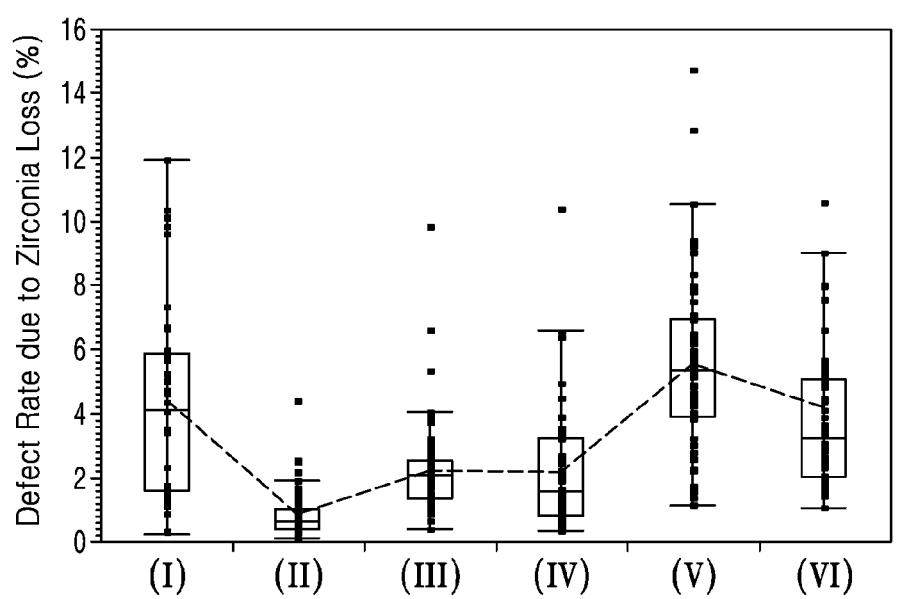
FIG. 7 is a graph showing changes in a defect rate in cases where the first heat exchange module is applied and the first heat exchange module is not applied.

FIG. 7 is a graph showing changes in a defect rate in cases where the first heat exchange module 110 is applied (II) and where the first heat exchange module 110 is not applied (I, III, IV, V, and VI).

Referring to FIG. 7, a defect rate (about 0.86%) when the first heat exchange module 110 is applied (II) is meaningfully lower than those of the cases where the first heat exchange module 110 is not applied (I, III, IV, V, and VI).

Here, the defect rate is defined as a percentage of defective product(s) among total product wherein the defect is due to zirconia loss.

While the present disclosure has been particularly shown and described with reference to exemplary embodiments thereof, it will be understood that various changes in form and details may be made therein without departing from the spirit and scope of the following claims.

What is claimed is:

1. A glass product manufacturing apparatus comprising:
   a furnace comprising a gas heating zone and an electric heating zone;
   a first heat exchange module configured to recover heat from the furnace; and
   a pump configured to drive flow of a heat transfer medium fluid passing through the first heat exchange module,
   wherein at least a part of the first heat exchange module is thermally coupled with at least a part of an external surface of the electric heating zone.

2. The glass product manufacturing apparatus of claim 1, further comprising:
   a glass product processor configured to supply a processing fluid for processing the glass product; and
   a second heat exchange module configured to heat the processing fluid,
   wherein the second heat exchange module is configured to transfer heat from the heat transfer medium fluid to the processing fluid.

3. The glass product manufacturing apparatus of claim 1, wherein the gas heating zone is at a higher level than a highest level of glass melt in the furnace, and the electric heating zone is at a lower level than the highest level of the glass melt in the furnace.

4. The glass product manufacturing apparatus of claim 3, wherein at least a part of the first heat exchange module is in surface contact with an external surface of the electric heating zone.

5. The glass product manufacturing apparatus of claim 4, wherein the first heat exchange module is adhered to the external surface of the electric heating zone via a fixing member.

6. The glass product manufacturing apparatus of claim 4, wherein a surface-contact area between the first heat exchange module and the external surface of the electric heating zone ranges from about 15% to about 60% of an entire area of an external wall on which the first heat exchange module is provided.

7. The glass product manufacturing apparatus of claim 1, wherein the first heat exchange module is spaced apart from the external surface of the furnace.

8. The glass product manufacturing apparatus of claim 7, wherein a surface of the first heat exchange module facing the external surface of the furnace is substantially parallel with the external surface of the furnace.

9. A glass product manufacturing apparatus comprising:
   a furnace comprising a gas heating zone and an electric heating zone;
   a glass product processor configured to supply a processing fluid for processing the glass products; and
   a heat exchange device,
   wherein the heat exchange device comprises:
   a first heat exchange module configured to recover heat from the furnace;
   a second heat exchange module configured to heat the processing fluid;
   a heat transfer medium fluid circulating between the first heat exchange module and the second heat exchange module; and
   a pump configured to drive a flow of the heat transfer medium fluid, wherein the heat transfer medium fluid is water.

10. The glass product manufacturing apparatus of claim 9, wherein the first heat exchange module comprises three sections spaced apart from one another in a lateral direction.

11. The glass product manufacturing apparatus of claim 9, wherein the first heat exchange module is configured to raise a temperature of the heat transfer medium fluid by about 7° C. to about 15° C.

12. The glass product manufacturing apparatus of claim 11, wherein the second heat exchange module is configured to raise a temperature of the processing fluid by about 3° C. to about 8° C.

13. The glass product manufacturing apparatus of claim 9, further comprising a first tank configured to store the heat transfer medium fluid supplied to the first heat exchange module, wherein the heat transfer medium fluid discharged from the first heat exchange module is configured to recycle to the first tank.

14. The glass product manufacturing apparatus of claim 13, further comprising a second tank configured to store the heat transfer medium fluid discharged from the second heat exchange module.

15. The glass product manufacturing apparatus of claim 9, wherein the furnace comprises a first side wall to which a supply device for supplying a raw material is coupled and a second side wall in which a glass melt outlet is mounted, and the first heat exchange module directly contacts the first side wall.

* * * * *